US012681841B2

(12) United States Patent
Kurian et al.

(10) Patent No.: US 12,681,841 B2
(45) Date of Patent: Jul. 14, 2026

(54) APPLICATION INTERFACE VIABILITY NETWORK

(71) Applicant: BANK OF AMERICA CORPORATION, Charlotte, NC (US)

(72) Inventors: Manu Kurian, Dallas, TX (US); Radha Karuppannan, Huntersville, NC (US); Surya Prakash Mahendarkar, Glen Allen, VA (US); Anna Mirarchi, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/944,938

(22) Filed: Nov. 12, 2024

(65) Prior Publication Data

US 2026/0133893 A1     May 14, 2026

(51) Int. Cl.
| | |
|---|---|
| *G06F 11/00* | (2006.01) |
| *G06F 11/3668* | (2025.01) |
| *G06N 3/0475* | (2023.01) |

(52) U.S. Cl.
CPC ....... *G06F 11/3684* (2013.01); *G06N 3/0475* (2023.01)

(58) Field of Classification Search
CPC .......................... G06F 11/3684; G06N 3/0475
USPC ....................................................... 714/1–57
See application file for complete search history.

(56) References Cited

U.S. PATENT DOCUMENTS

| | | | |
|---|---|---|---|
| 11,714,698 B1* | 8/2023 | Curtis ................... | G06F 18/214 |
| | | | 714/48 |
| 2010/0064177 A1* | 3/2010 | Li ........................ | G06F 11/1443 |
| | | | 714/38.14 |
| 2015/0100829 A1* | 4/2015 | Nanjundappa ...... | G06F 11/3688 |
| | | | 714/38.1 |
| 2016/0162397 A1* | 6/2016 | Kalyanasundram ......................... |
| | | | G06F 11/3684 |
| | | | 714/38.14 |
| 2018/0124453 A1* | 5/2018 | Zweig ................ | H04N 21/8456 |
| 2019/0121495 A1* | 4/2019 | Latheef ................. | G06F 9/453 |
| 2019/0265953 A1* | 8/2019 | Paul ........................ | G06F 9/542 |
| 2020/0133698 A1* | 4/2020 | Permenter .............. | H01H 13/14 |
| 2021/0365353 A1* | 11/2021 | Bhimireddy ........... | G06N 3/091 |
| 2022/0156511 A1* | 5/2022 | Jin .......................... | G06T 17/20 |

(Continued)

*Primary Examiner* — Sarai E Butler
(74) *Attorney, Agent, or Firm* — Moore & Van Allen PLLC; Nicholas C. Russell

(57)          ABSTRACT

Systems, computer program products, and methods are described herein for viability testing of applications in a distributed computing environment. An example system may include a plurality of generative AI subsystems, each associated with a corresponding application within the distributed environment. Each generative AI subsystem may be configured to analyze the functional accessibility of the associated application and generate a first output based on the analysis to facilitate user interaction with the application. The system may further include a primary generative AI subsystem that may be configured to receive the first outputs from the generative AI subsystems, determine dependency information among the applications based on the first outputs, and generate a second output based on at least the dependency information. The second output may include documentation for data interactions among the applications, providing insights into dependencies, data flows, and connectivity within the distributed computing environment.

20 Claims, 6 Drawing Sheets

(56)          References Cited

U.S. PATENT DOCUMENTS

| | | | |
|---|---|---|---|
| 2022/0245013 A1* | 8/2022 | Ciabarra, Jr. | G06F 11/079 |
| 2023/0055527 A1* | 2/2023 | Majithia | G06F 11/079 |
| 2023/0161692 A1* | 5/2023 | Karri | G06F 11/3688 |
| | | | 717/132 |
| 2023/0195611 A1* | 6/2023 | Singh | G06F 11/3688 |
| | | | 714/38.1 |
| 2023/0205657 A1* | 6/2023 | Deboy | G06F 9/44526 |
| | | | 714/22 |
| 2024/0168864 A1* | 5/2024 | Hamlin | G06N 3/04 |
| 2024/0354503 A1* | 10/2024 | Baruch | G06F 16/345 |
| 2025/0023859 A1* | 1/2025 | Seidenstein | H04L 63/0884 |
| 2025/0094300 A1* | 3/2025 | Sharma | G06F 11/261 |
| 2025/0219894 A1* | 7/2025 | Gupta | H04L 41/0613 |

* cited by examiner

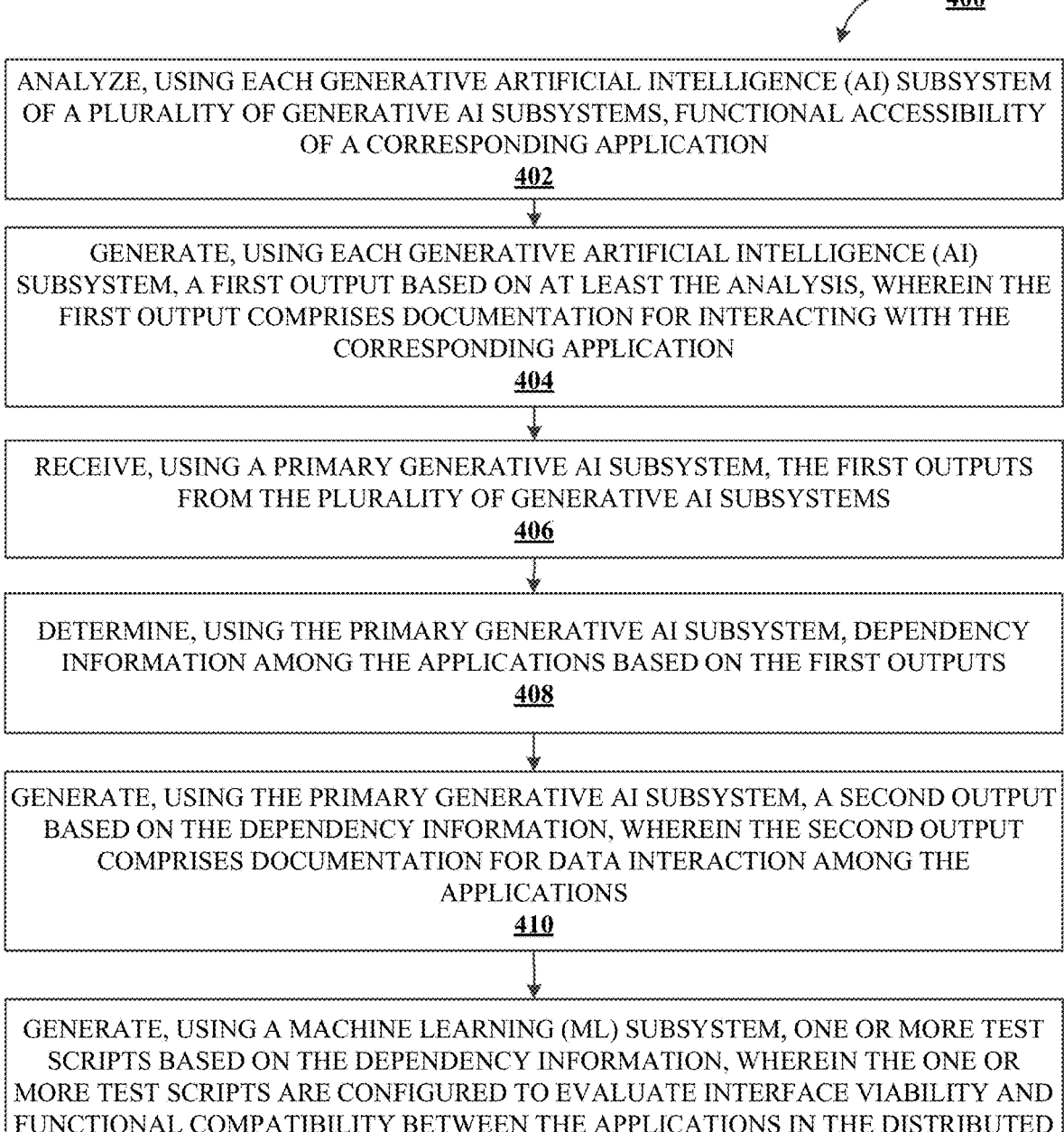

400

ANALYZE, USING EACH GENERATIVE ARTIFICIAL INTELLIGENCE (AI) SUBSYSTEM OF A PLURALITY OF GENERATIVE AI SUBSYSTEMS, FUNCTIONAL ACCESSIBILITY OF A CORRESPONDING APPLICATION
402

GENERATE, USING EACH GENERATIVE ARTIFICIAL INTELLIGENCE (AI) SUBSYSTEM, A FIRST OUTPUT BASED ON AT LEAST THE ANALYSIS, WHEREIN THE FIRST OUTPUT COMPRISES DOCUMENTATION FOR INTERACTING WITH THE CORRESPONDING APPLICATION
404

RECEIVE, USING A PRIMARY GENERATIVE AI SUBSYSTEM, THE FIRST OUTPUTS FROM THE PLURALITY OF GENERATIVE AI SUBSYSTEMS
406

DETERMINE, USING THE PRIMARY GENERATIVE AI SUBSYSTEM, DEPENDENCY INFORMATION AMONG THE APPLICATIONS BASED ON THE FIRST OUTPUTS
408

GENERATE, USING THE PRIMARY GENERATIVE AI SUBSYSTEM, A SECOND OUTPUT BASED ON THE DEPENDENCY INFORMATION, WHEREIN THE SECOND OUTPUT COMPRISES DOCUMENTATION FOR DATA INTERACTION AMONG THE APPLICATIONS
410

GENERATE, USING A MACHINE LEARNING (ML) SUBSYSTEM, ONE OR MORE TEST SCRIPTS BASED ON THE DEPENDENCY INFORMATION, WHEREIN THE ONE OR MORE TEST SCRIPTS ARE CONFIGURED TO EVALUATE INTERFACE VIABILITY AND FUNCTIONAL COMPATIBILITY BETWEEN THE APPLICATIONS IN THE DISTRIBUTED COMPUTING ENVIRONMENT
412

FIGURE 4

APPLICATION INTERFACE VIABILITY NETWORK

TECHNOLOGICAL FIELD

Example embodiments of the present disclosure relate to the field of generative artificial intelligence (AI) systems and, more specifically, to systems and methods that employ generative AI to analyze, document, and manage interactions among software applications.

BACKGROUND

As applications are developed, downloaded, or updated, the resulting user interface (UI) and overall usability can become increasingly complex. This complexity is particularly evident when applications interact with other connected or downstream applications, leading to potential difficulties for users in understanding updates and changes. Existing solutions often involve manual documentation or user-initiated learning processes, which may be time-consuming, error-prone, and resource-intensive. Additionally, updates to one application can indirectly impact other applications, potentially introducing issues that users struggle to interpret or address.

Applicant has identified a number of deficiencies and problems associated with existing methods for documenting and managing the usability and interactions of software applications, particularly in interconnected environments. Many of these identified problems have been solved by developing solutions that are included in embodiments of the present disclosure, many examples of which are described in detail herein.

BRIEF SUMMARY

Systems, methods, and computer program products are provided for automating the analysis, documentation, and usability management of applications, particularly in multi-application environments.

In one aspect, a system for viability testing of applications in a distributed computing environment is presented. The system comprising: a plurality of generative artificial intelligence (AI) subsystems, wherein each generative AI subsystem is associated with a corresponding application within the distributed computing environment, wherein each generative AI subsystem is configured to: analyze functional accessibility of the corresponding application; and generate a first output based on at least the analysis, wherein the first output comprises documentation for interacting with the corresponding application; and a primary generative AI subsystem operatively coupled to the plurality of generative AI subsystems, wherein the primary generative AI subsystem is configured to: receive the first outputs from the plurality of generative AI subsystems; determine dependency information among the applications based on the first outputs; and generate a second output based on at least the dependency information, wherein the second output comprises documentation for data interaction among the applications.

In some embodiments, the system further comprises a machine learning (ML) subsystem, wherein the ML subsystem is configured to: generate one or more test scripts based on the dependency information, wherein the one or more test scripts are configured to evaluate interface viability and functional compatibility between the applications in the distributed computing environment.

In some embodiments, in analyzing the functional accessibility, each generative AI subsystem is configured to implement a usability assessment framework on the corresponding application, wherein the usability assessment framework comprises at least one of a user interaction data analysis, heuristic evaluation, natural language processing (NLP) for user feedback, simulated user interactions, automated usability testing, interface element recognition and complexity analysis, or predictive usability modeling.

In some embodiments, in analyzing the functional accessibility, each generative AI subsystem is configured to: assess, using the usability assessment framework, user interface elements of the corresponding application to identify navigability, usability, and interaction pathways; evaluate performance metrics associated with user interactions based on the navigability and interaction pathways to determine operational efficiency; analyze error handling mechanisms and user feedback prompts within the corresponding application based on the performance metrics to assess clarity and accessibility of functionality; determine application workflows and dependencies that impact user access to specific functions based on the analysis of error handling mechanisms and the user feedback prompts; and generate accessibility metrics from the application workflows and dependencies, wherein the accessibility metrics comprise a quantitative representation of the corresponding application's functional accessibility for use.

In some embodiments, the first output comprises step-by-step instructions for performing common tasks within the corresponding application based on the identified navigability and interaction pathways.

In some embodiments, the first output further comprises visual aids, including annotated screenshots, flow diagrams, or user interface mappings, to enhance user understanding of interactions within the corresponding application.

In some embodiments, each generative AI subsystem is configured to analyze the functional accessibility of the corresponding application in response to a change in the corresponding application.

In some embodiments, the change in the corresponding application comprises at least one of an update to the corresponding application's user interface components, including modifications to layout, color scheme, or interaction elements, an enhancement or addition of new features and/or functionalities within the corresponding application, a modification to application workflows or task sequences that impacts user interaction pathways, a change in application dependencies of the corresponding application, wherein the corresponding application requires communication or data exchange with additional systems or components within the distributed computing environment, a revision of error handling mechanisms, including updates to error messages or feedback prompts presented to users, an adjustment to performance parameters, such as response times or resource allocation, that impacts the corresponding application's operational efficiency, a security update that affects user access controls, permissions, or authentication processes within the application, or an alteration to accessibility features.

In some embodiments, the first output comprises interactive documentation that adapts based on user role, experience level, or recent interactions within the application, providing tailored guidance for navigating and using the corresponding application.

In some embodiments, the documentation in the first output comprises at least contextual tooltips and embedded help elements that appear within the corresponding application's interface, providing users with on-demand assistance and instructions specific to each interface component or function.

In some embodiments, in determining dependency information among the applications based on the first outputs, the primary generative AI subsystem is further configured to analyze data flow requirements and communication protocols between the applications to identify and classify dependencies, wherein the dependencies comprise at least one of direct data dependencies, sequential task dependencies, or conditional execution dependencies among the applications.

In some embodiments, the documentation for data interaction among the applications comprises a visual interaction map that illustrates data flow paths, data dependencies, and interaction sequences among the applications, enabling users to understand data relationships and identify potential bottlenecks in data exchanges.

In some embodiments, the documentation for data interaction among the applications comprises a data integration protocol that specifies data formatting standards, communication methods, and security requirements for data exchanges between applications, providing standardized instructions for maintaining compatibility and secure data interactions.

In another aspect, a method for viability testing of applications in a distributed computing environment is presented. The method comprising: analyzing, using each generative artificial intelligence (AI) subsystem of a plurality of generative AI subsystems, functional accessibility of a corresponding application; generating, using each generative artificial intelligence (AI) subsystem, a first output based on at least the analysis, wherein the first output comprises documentation for interacting with the corresponding application; receiving, using a primary generative AI subsystem, the first outputs from the plurality of generative AI subsystems; determining, using the primary generative AI subsystem, dependency information among the applications based on the first outputs; and generating, using the primary generative AI subsystem, a second output based on the dependency information, wherein the second output comprises documentation for data interaction among the applications.

In yet another aspect, a computer program product for viability testing of applications in a distributed computing environment is presented. The computer program product comprising a non-transitory computer-readable medium comprising code configured to cause an apparatus to: analyze, using each generative artificial intelligence (AI) subsystem of a plurality of generative AI subsystems, functional accessibility of a corresponding application; generate, using each generative artificial intelligence (AI) subsystem, a first output based on at least the analysis, wherein the first output comprises documentation for interacting with the corresponding application; receive, using a primary generative AI subsystem, the first outputs from the plurality of generative AI subsystems; determine, using the primary generative AI subsystem, dependency information among the applications based on the first outputs; and generate, using the primary generative AI subsystem, a second output based on the dependency information, wherein the second output comprises documentation for data interaction among the applications.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
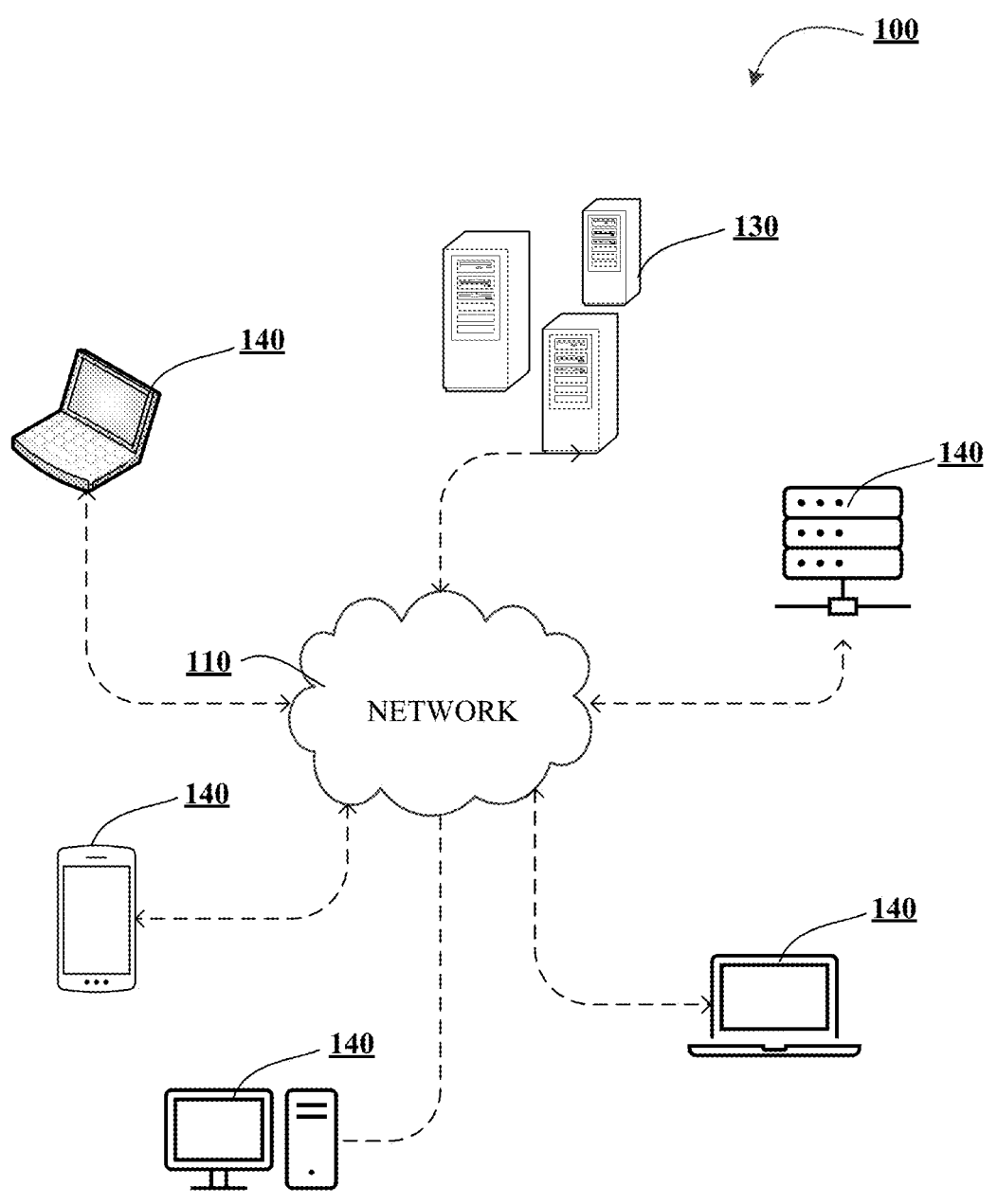
Figure 1B:
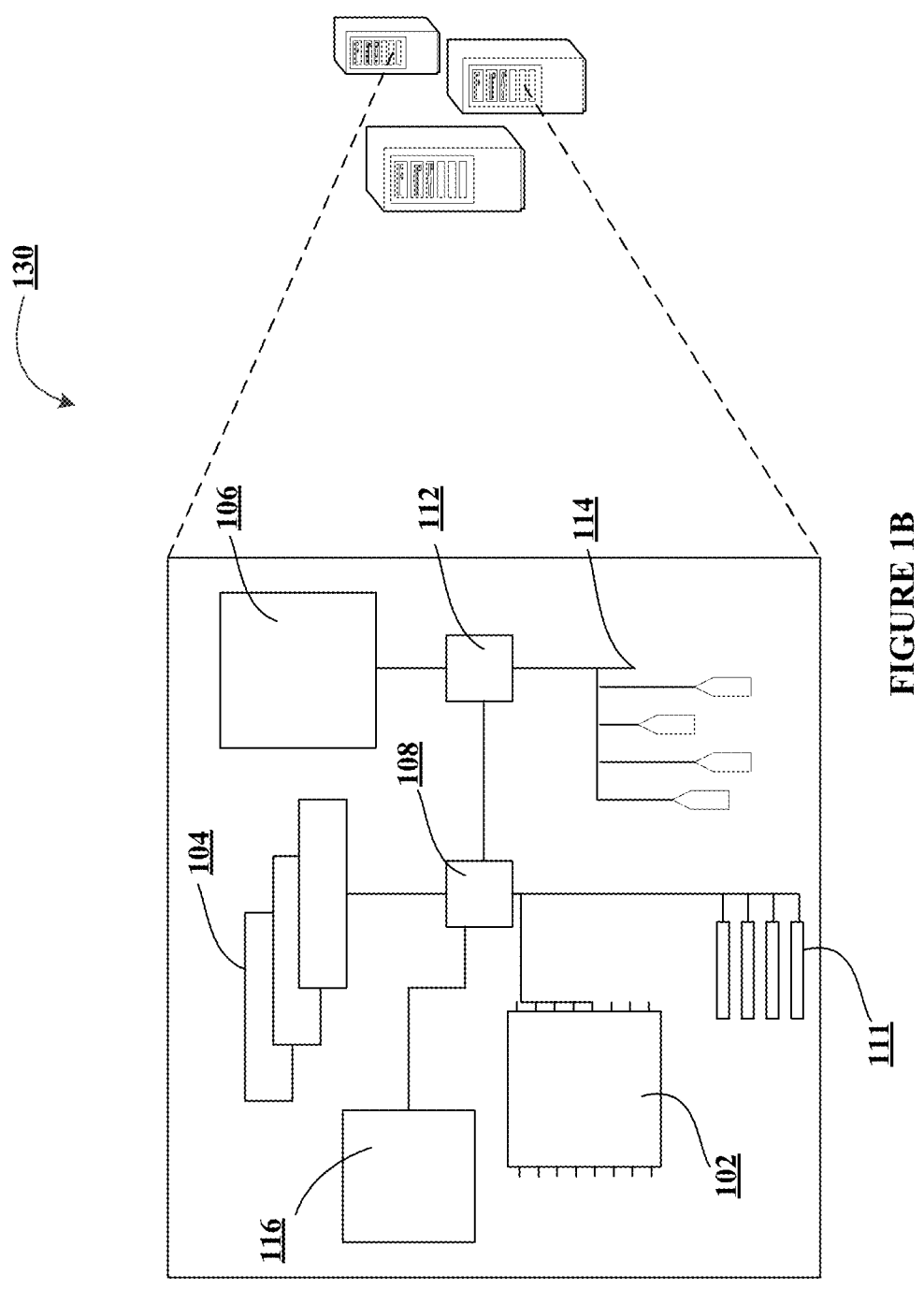
Figure 1C:
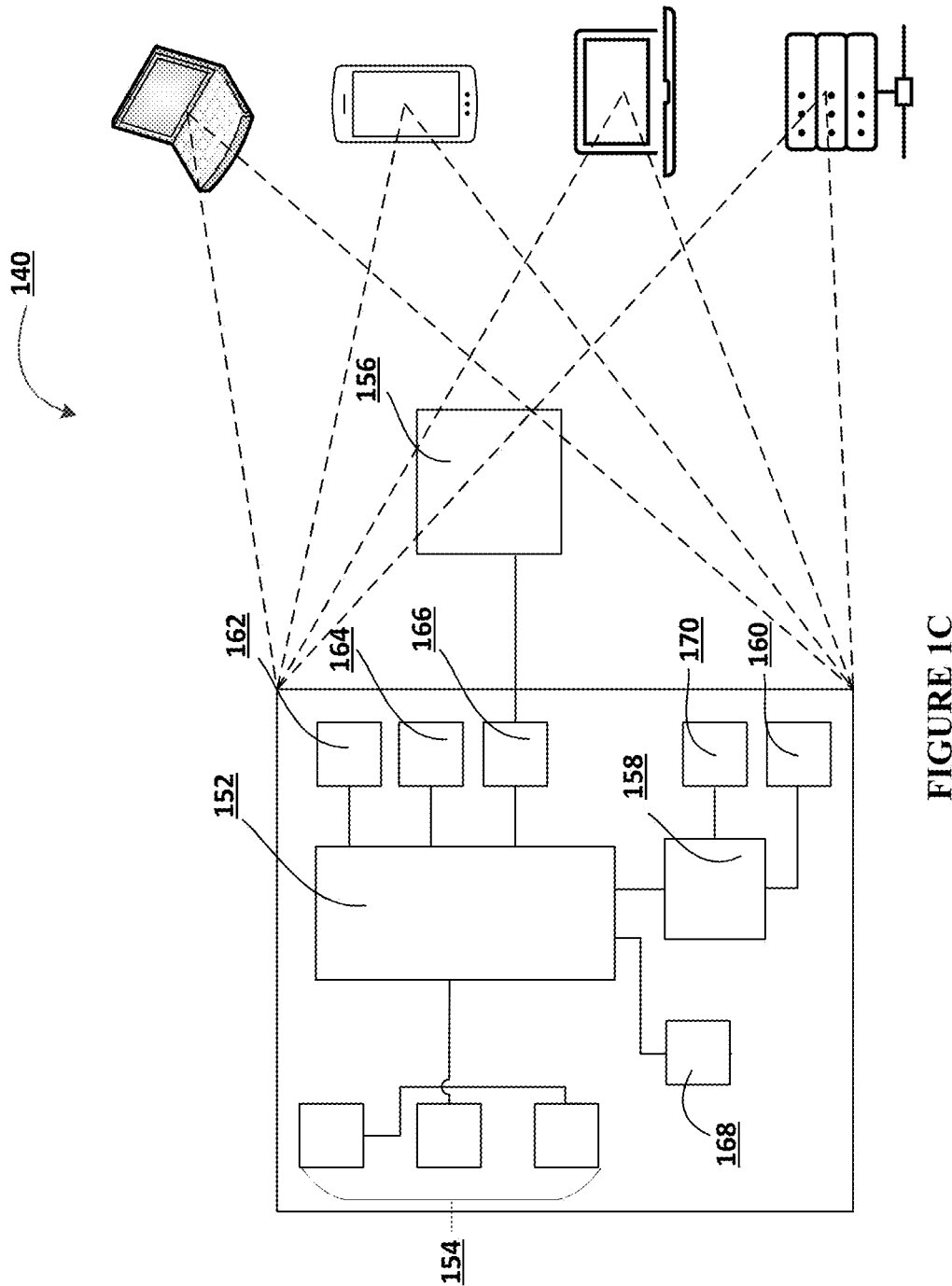
Figure 2:
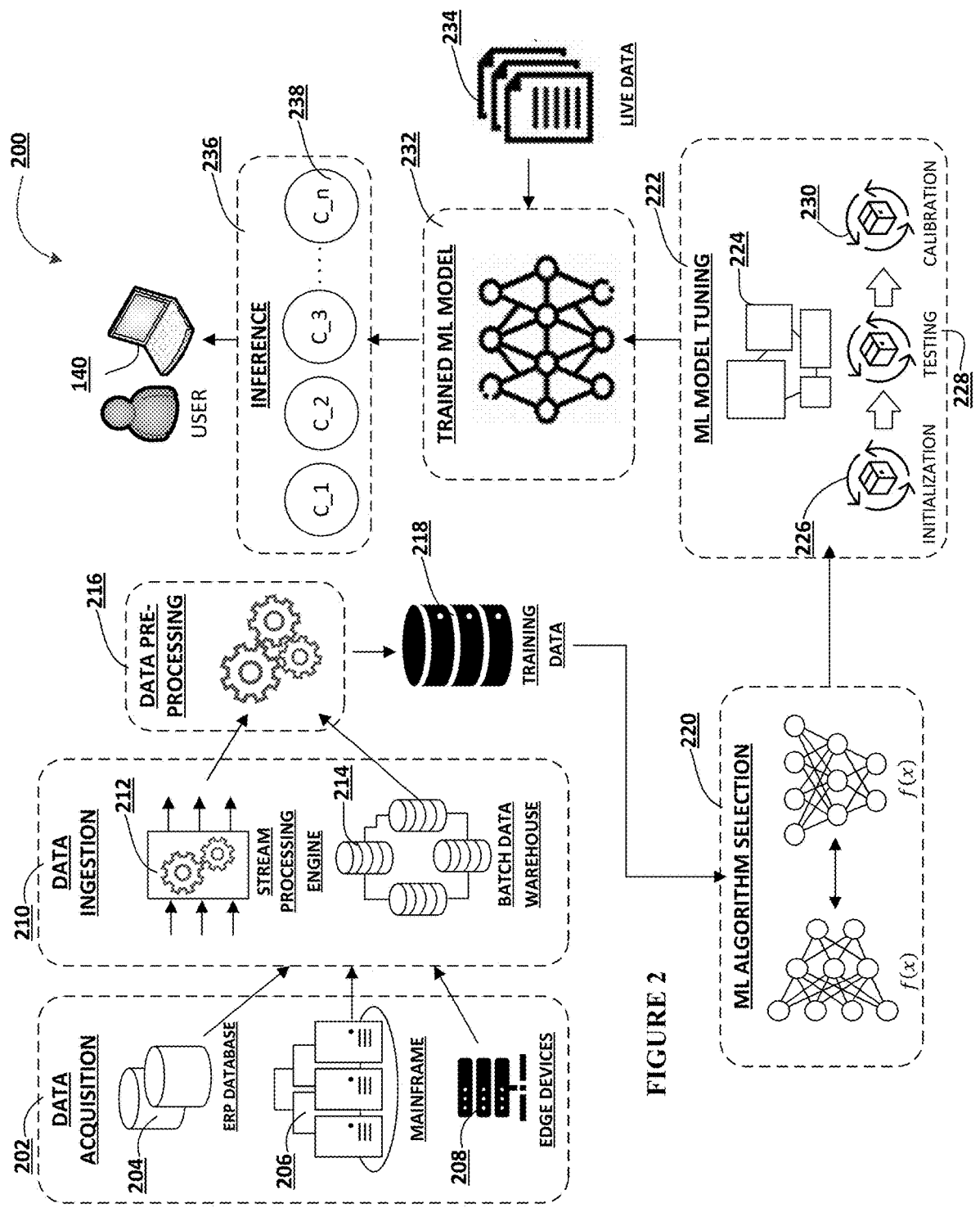
Figure 3:
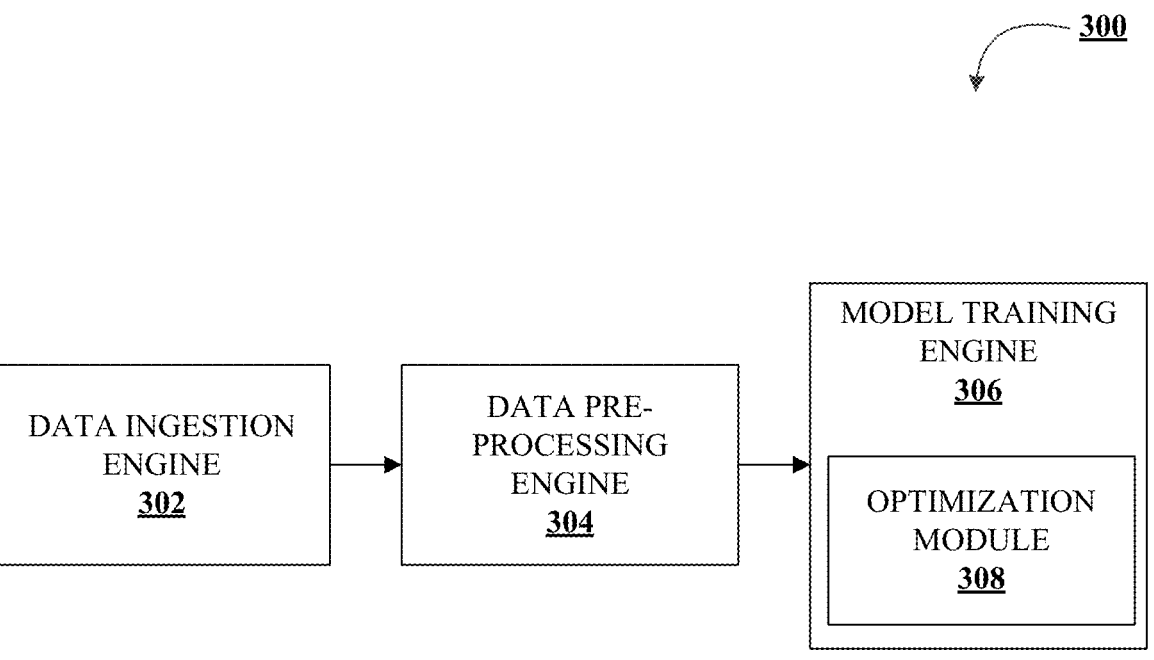

FIGS. 1A-1C illustrates technical components of an exemplary distributed computing environment for viability testing of applications, in accordance with an embodiment of the invention;

FIG. 2 illustrates an exemplary machine learning (ML) subsystem architecture, in accordance with an embodiment of the invention;

FIG. 3 illustrates an exemplary generative AI subsystem 300, in accordance with an embodiment of the invention; and FIG. 4 illustrates a process flow for viability testing of applications in a distributed computing environment, in accordance with an embodiment of the invention.

DETAILED DESCRIPTION

Overview

Users frequently encounter difficulties in understanding and interacting with applications due to changes in functionalities, capabilities, and interfaces, particularly when applications are updated, or new applications are introduced. These issues can be compounded in interconnected environments, where updates to one application may have indirect effects on related applications. Current approaches to addressing these issues often involve manual documentation or piecemeal instructional resources, leading to inefficiencies, increased demand for computing resources, and a lack of comprehensive insight into application interdependencies and connectivity.

Embodiments of the disclosure provide a system utilizing generative AI components to automate the analysis and documentation of individual applications and their interactions. Each generative AI sub-component may reside on an application to evaluate changes, functionalities, and usability, producing outputs that describe how to interact with the application. Furthermore, additional generative AI sub-components may perform similar analyses on other applications. A primary generative AI component may then aggregate the outputs from these sub-components to identify relationships and data blending across applications. Based on this analysis, the primary generative AI may generate an end-to-end document detailing the process and connectivity between applications. In certain embodiments, the system may include a predictive AI component that utilizes generated documentation to produce test scripts or cases, designed to assess interface viability between applications and determine potential areas for improvement. These test scripts may evaluate the connective viability between applications, addressing issues that could otherwise impact usability.

Embodiments of the disclosure achieve these objectives with fewer procedural steps, thereby reducing required computing resources, such as processing, storage, and network resources. Furthermore, by automating the generation of comprehensive documentation, embodiments of the invention may remove the need for manual input, thus improving both speed and efficiency while conserving computing resources. Additionally, the invention may optimize the quantity of resources necessary for execution, minimizing network load and resource consumption. Furthermore, the technical solution described herein uses a rigorous, computerized process to perform specific tasks and activities that were not previously implemented, thus conserving computing resources. In specific implementations, the technical solution bypasses steps traditionally required, further reducing resource demand and improving overall system efficiency.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, other information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

Example System Environment

FIGS. 1A-1C illustrate technical components of an exemplary distributed computing environment 100 for application analysis, documentation, and predictive testing, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, or the like, as well as a range of digital computing devices, including laptops, desktops, video recorders, audio/video players, radios, workstations, and/or the like. Additionally, system 130 may include a variety of auxiliary network devices, encompassing wearable devices, Internet-of-things (IoT) devices, electronic kiosk devices, entertainment consoles, mainframes, and/or the like, in any combination to cater to the complexity and diversity of contemporary digital ecosystems.

The end-point device(s) 140 may encompass an array of electronic devices, such as personal digital assistants, cellular telephones, smartphones, laptops, desktops, and merchant input devices like point-of-sale (POS) systems, electronic payment kiosks, and automated teller machines (ATMs). End-point device(s) 140 may also include edge devices like routers, routing switches, integrated access devices (IAD), and/or the like, and devices capable of interfacing with 5G networks, delivering enhanced data processing and connectivity.

The network 110 may include a distributed network architecture that spans a variety of network types, facilitating a cohesive data communication network that can be managed jointly or individually. The network architecture supports shared communication as well as distributed processing across platforms such as telecommunication networks, local area networks (LAN), wide area networks (WAN), global area networks (GAN), the Internet infrastructure, and/or the like. Network 110 may also integrate emerging networking technologies, including software-defined networking (SDN), network function virtualization (NFV), and next-generation wireless communication standards like 5G. Network 110 may employ secure or unsecure, as well as wireless, wired, and optical interconnection technologies, and/or the like, to accommodate a spectrum of communication and processing needs.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

In some embodiments, examples of subsystems may include generative AI subsystems, primary generative AI subsystem, and ML subsystem.

Each generative AI subsystem may be associated with a corresponding application within the distributed computing environment. The generative AI subsystems may be configured to analyze the functional accessibility of the associated application, including evaluating usability, interface components, and user interaction pathways. Based on this analysis, each generative AI subsystem may generate a first output, comprising documentation to assist users in interacting with the application, which may include elements such as step-by-step instructions, annotated screenshots, or context-sensitive tooltips.

The primary generative AI subsystem may be operatively coupled to the plurality of generative AI subsystems and configured to receive the first outputs generated by them. The primary generative AI subsystem may determine dependency information among the applications based on the first outputs, including data flow requirements, communication protocols, and task dependencies. The primary generative AI subsystem may then generate a second output, which includes documentation for data interactions among the applications, potentially in formats such as visual interaction maps or data integration protocols.

The ML subsystem may generate test scripts based on the dependency information determined by the primary generative AI subsystem. These test scripts may evaluate interface viability and functional compatibility between applications within the distributed computing environment. By executing these test scripts, the ML subsystem may assess potential connectivity, compatibility, or performance issues, enabling adjustments to maintain stable inter-application interactions.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, inference engine 236, and may optionally include federated learning systems (not shown) and edge computing resources (not shown) for distributed processing and privacy-enhanced model training. In some embodiments, AutoML mechanisms may be incorporated to automate aspects of model selection, feature engineering, and hyperparameter tuning.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. In addition to conventional data sources, the data acquisition engine 202 may support decentralized storage systems, such as blockchain-based data sources, and privacy-preserving methods such as differential privacy. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. The data ingestion engine 210 may process the data using an event-driven architecture 246, where actions are triggered based on data-related events. In addition to batch processing (e.g., batch data warehouse 214) and real-time stream processing (e.g., stream processing engine 212), the system may use cloud-native data pipelines, including serverless frameworks 248 that dynamically allocate computing resources based on workload demand, thereby optimizing the use of network, storage, and processing resources. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed. In some embodiments, the data pre-processing engine 216 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. In some embodiments, the tuning engine 222 may leverage reinforcement learning algorithms or neural architecture search to optimize hyperparameters and model structures autonomously. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyper-parameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary generative AI subsystem 300, in accordance with an embodiment of the invention. The generative AI subsystem 300 may include a data ingestion engine 302, a data pre-processing engine 304, a model training engine 306, and a loss function and optimization engine 308. It should be understood that the generative AI subsystem 300 is merely an example, and other embodiments may include more, fewer, or different components depending on the specific requirements and implementations of the system. For instance, additional engines for data validation, feature selection, or distributed computing may be integrated into the subsystem, or certain components described herein may be consolidated or omitted based on system performance objectives. Therefore, the generative AI subsystem 300 should not be considered limiting and may be adapted to various configurations within the scope of the invention.

The data ingestion engine 302 may identify various internal and/or external data sources to generate, test, and/or integrate new features for training the generative AI model. These internal and/or external data sources (e.g., text corpora, web-based text data, document repositories, or decentralized text storage system) may be initial locations where the data originates or where physical information is first digitized. In addition to conventional data sources, the data ingestion engine 302 may support decentralized storage systems, such as blockchain-based data sources, and privacy-preserving methods such as differential privacy. The data ingestion engine 302 may identify the location of the data and describe connection characteristics for access and retrieval of data. In some embodiments, data is transported from each data source using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like.

Depending on the nature of the data, the data ingestion engine 302 may move the data to a destination for storage or further analysis. Typically, the data may be in varying formats as they come from different sources, including RDBMS, other types of databases, S3 buckets, CSVs, or from streams. For a large language model ("LLM"), text data may originate from sources such as web scrapes, social media, large public text datasets, or the like. Since the data comes from different places, it needs to be cleansed and transformed so that it can be analyzed together with data from other sources. The data may be ingested in real-time, using stream processing, in batches using a batch data warehouse, or a combination of both. Stream processing may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse collects and transfers data in batches according to scheduled intervals, trigger events, or any other logical ordering.

In machine learning, the quality of data and the useful information that can be derived therefrom directly affects the ability of the machine learning model to learn. The data pre-processing engine 304 may implement advanced integration and processing steps needed to prepare the data for machine learning execution, including tokenization, text normalization, and removal of irrelevant elements like HTML tags in web-based data, especially for LLM training. This may include modules to perform any upfront, data transformation to consolidate the data into alternate forms by changing the value, structure, or format of the data using generalization, normalization, attribute selection, and aggregation, text-specific transformations such as stemming and lemmatization, data cleaning by filling missing values, smoothing the noisy data, resolving the inconsistency, and removing outliers, and/or any other encoding steps as needed. In some embodiments, the data pre-processing engine 304 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 304 may transform categorical data into numerical formats that are suitable for machine learning algorithms. In this regard, the data pre-processing engine 304 may use techniques such as one-hot encoding or label encoding depending on the nature of the categorical variables and the intended use of the data.

In some embodiments, the data pre-processing engine 304 may also include dimensionality reduction techniques, where the number of input features is reduced while retaining the most relevant information. In this regard, the data pre-processing engine 304 may include methods such as Principal Component Analysis (PCA) or apply feature selection algorithms to remove redundant or irrelevant features, thereby reducing the computational complexity of the model training phase. Feature selection may be particularly beneficial in datasets with a high number of features, ensuring that the generative AI models do not overfit to noise or irrelevant details. The pre-processed data output from the data pre-processing engine 304 may then be fed into the model training module 306.

The model training engine 306 may be responsible for training the generative AI models using the pre-processed data from the data pre-processing engine 304. The model training engine 306 may implement various machine learning algorithms, including but not limited to Generative Adversarial Networks (GANs), Variational Autoencoders (VAEs), transformers, diffusion models, or other specialized architectures depending on the specific requirements of the system. These models may be used in a broad range of applications, such as LLMs for text generation, image generation models, video synthesis models, audio generation models, and/or the like. The model training engine 306 may optimize these models by continuously adjusting their internal parameters based on the patterns and relationships identified within the data.

In some embodiments, the model training engine 306 may include a training data handler, which manages the partitioning of the pre-processed data into training, validation, and testing datasets. The training data is used to update the model's parameters, while the validation and testing datasets are reserved to evaluate the model's performance during and after training. The model training engine 306 may support various data-handling strategies, such as cross-validation or random shuffling, to ensure that the model generalizes well and is not overfitting to the training data.

In embodiments involving large language models, the model training engine 306 may utilize transformer-based architectures, such as the Transformer, BERT, GPT, or the like. Transformer models rely on mechanisms like self-attention to capture dependencies between words in a sequence, regardless of their distance from one another. The self-attention mechanism allows the model to weigh the importance of different words in a sentence and establish complex relationships important for understanding context. During training, the model may process vast amounts of text data and learn to predict the next word or token in a sequence based on the input context. This training process allows LLMs to generate coherent text, complete sentences, translate languages, or answer questions based on learned patterns from the data.

The transformer-based LLMs may be trained using autoregressive (e.g., GPT) or masked-language modeling techniques (e.g., BERT). In autoregressive models, the training process may include predicting the next word in a sequence by progressively revealing more context to the model. The model iteratively improves its predictions based on its performance during prior iterations. Masked-language modeling involves masking certain words in a sentence and training the model to correctly predict the masked words based on surrounding context. Both approaches enable LLMs to capture intricate patterns in human language, improving their ability to handle tasks such as summarization, translation, and text generation. Loss functions like cross-entropy loss may be used to optimize the model's performance by comparing predicted tokens with the actual tokens in the dataset to guide the model to minimize prediction errors during training.

In embodiments involving image generation models, the model training engine 306 may utilize transformer-based architectures, such as Vision Transformers (ViTs) or generative adversarial networks (GANs). Vision Transformers rely on self-attention mechanisms to process images as sequences of patches rather than whole images, allowing the model to capture spatial dependencies and patterns across the image. During training, the model may be exposed to large datasets containing diverse image types to learn features like textures, edges, and shapes. The model may then generate or reconstruct images by interpreting these patterns and applying learned spatial relationships. GAN-based models may also be used, where a generator network creates images, and a determinator network evaluates their realism, enabling the model to improve through adversarial training.

Image generation models may employ various training techniques, such as pixel-wise reconstruction or adversarial training, depending on the architecture. Pixel-wise reconstruction methods involve learning to reconstruct an image from its corrupted or downscaled version, optimizing the model to minimize the difference between the predicted and actual pixels (e.g., using mean squared error as the loss function). Adversarial training, often used with GANs, involves iteratively improving the generator network to produce images that are increasingly indistinguishable from real images, based on feedback from the determinator network. These approaches allow the model to capture complex visual features, enabling applications such as image synthesis, enhancement, and style transfer.

For video generation models, the model training engine 306 may employ transformer-based architectures like Video Transformers or GAN-based models specifically designed for handling temporal sequences. Video Transformers use self-attention mechanisms to model dependencies not only between pixels within a single frame but also across frames, allowing them to understand temporal relationships and motion patterns in videos. The model may be trained on large video datasets, enabling it to learn and reproduce dynamic changes and interactions between objects over time. GAN-based video models may incorporate spatiotemporal networks to evaluate the realism of generated video sequences, optimizing the model to produce continuous and coherent frames.

Video generation models may utilize spatial-temporal modeling techniques or adversarial training for generating realistic motion and video sequences. Spatial-temporal modeling involves learning the spatial features within each frame while simultaneously capturing the temporal dependencies between frames, optimizing the model's ability to predict future frames or complete missing sequences. Loss functions like mean squared error or perceptual loss may be applied to reduce discrepancies between predicted and actual frames. Adversarial training, on the other hand, may involve a generator creating video sequences and a determinator evaluating their realism, encouraging the generator to improve by minimizing the discrepancy identified by the determinator. These techniques may enable video generation models to create coherent and realistic sequences, useful in applications such as video synthesis and animation.

In audio generation models, the model training engine 306 may utilize architectures such as Audio Transformers or recurrent neural networks (RNNs) like WaveNet, designed to handle sequential and waveform data. Audio Transformers leverage attention mechanisms to capture relationships between segments of audio, allowing them to model temporal dependencies and predict the next audio sample based on previous context. During training, the model may process large audio datasets containing diverse sound patterns to learn representations of different audio features, such as frequency, amplitude, and harmonics. This training enables the model to generate coherent audio sequences, including speech, music, or ambient sounds, by synthesizing these learned patterns.

Audio generation models may be trained using sequence modeling techniques or autoregressive methods, depending on the architecture. Sequence modeling techniques involve processing and predicting sequences of audio samples, optimizing the model to capture and reproduce temporal dependencies in sound. Autoregressive methods, such as those employed in WaveNet, focus on predicting each audio sample based on prior samples, progressively refining the generated audio sequence over multiple iterations. Loss functions like mean absolute error or cross-entropy loss may be used to minimize the error between predicted and actual audio samples, guiding the model to improve its accuracy. These approaches allow audio generation models to create continuous and realistic audio outputs, applicable in areas such as speech synthesis, music generation, and sound effect creation.

The reconstruction loss ensures that the difference between the original input and the reconstructed output is minimized, guiding the decoder to generate outputs that closely resemble the input data. The second component, KL divergence loss, regularizes the latent space by ensuring that the distribution of latent variables conforms to a predefined probabilistic distribution, often a Gaussian distribution. This constraint encourages the model to learn a well organized and smooth latent space, allowing for meaningful sampling from this space during inference. By combining these loss functions, the VAE can learn a latent space that not only captures the underlying patterns in the data but also allows for the generation of novel outputs by sampling new points from this space. During the inference phase, the trained model can sample random points from the latent space to generate new, previously unseen data instances.

In training generative AI models, the model training engine 306 may implement optimization techniques such as gradient clipping, learning rate scheduling, and mixed-precision training. Gradient clipping may be used to stabilize the training process, especially in transformer-based models, by capping the magnitude of gradients to prevent them from becoming excessively large. Learning rate scheduling may involve gradually increasing the learning rate during initial training phases (warm-up) and then decaying it as training progresses to fine-tune the model's parameters more effectively. Mixed-precision training, which leverages lower-precision (e.g., float16) arithmetic while retaining higher precision (e.g., float33) for specific calculations, may be used to accelerate training and reduce memory consumption, enabling the model to scale efficiently even when trained on large datasets.

In some embodiments, the model training engine 306 may implement early stopping mechanisms to prevent overfitting. Early stopping monitors the generative AI model's performance on the validation dataset, halting the training process if the performance does not improve after a specified number of iterations. This ensures that the generative AI model does not continue training on noise or irrelevant patterns, which could degrade its performance on unseen data. The model training engine 306 may also support distributed training across multiple computing nodes, allowing the system to scale its computational resources as needed. Distributed training may involve splitting the generative AI model and data across multiple machines or GPUs, where each node processes a portion of the data and updates the model in parallel. This is particularly useful for large datasets or models that require significant computational power, such as deep generative models. The model training engine 306 may synchronize the updates across the nodes using techniques like synchronous or asynchronous gradient descent.

Once the generative AI model is trained, the model training engine 306 may save the final trained generative AI model in a persistent storage location for future use. In specific embodiments, metadata such as the number of epochs, the final loss values, and values of learned parameters may be logged for model versioning and/or retraining at a later stage. In some embodiments, the model training engine 306 may also implement transfer learning, where a pre-trained model is fine-tuned on a smaller, domain-specific dataset. This may reduce the amount of time and data required to train a new model, especially in cases where the available data is limited or highly specialized. The model training engine 306 may adjust the parameters of the pre-trained model to better align with the new dataset, while preserving the learned features from the original training.

In embodiments involving LLMs, new output is generated by sampling from the model's probability distribution of tokens, conditioned on the context provided as input. Transformer-based architectures, such as GPT, use an auto-regressive approach where the model predicts the next token in a sequence one step at a time, using previously generated tokens as input for subsequent predictions. The process starts with a prompt or an initial sequence of words, and the model iteratively generates new tokens, forming coherent sentences or paragraphs based on the learned context and language patterns. For masked-language modeling (e.g., BERT), new output may be generated by filling in masked parts of the input sequence, allowing the model to complete sentences or generate variations of the provided text. The generated output can be controlled by adjusting parameters which influences the randomness of the token sampling, enabling the generation of diverse or deterministic responses.

In image generation models, such as those using ViTs or GANs, new output is generated by sampling from the learned distribution in the model's latent space. For GANs, the generator network creates an image by transforming random noise vectors into structured image outputs through a series of layers that learn visual features like shapes, textures, and colors. The generated image is then refined through adversarial feedback from the determinator network, which assesses the realism of the generated output. For transformer-based image models, the process may involve reconstructing images by assembling patches based on the learned dependencies between them. Input conditions, such as prompts describing desired features or specific noise vectors, guide the generation process, allowing for the creation of customized images or variations of existing visual styles. These models may also generate images based on style transfer techniques or predefined templates, synthesizing images that align with the characteristics present in the training data.

Video generation models utilize spatiotemporal dependencies to synthesize new video sequences based on the patterns learned during training. In transformer-based architectures, the model may generate video frames sequentially, predicting the next frame based on the input frames and the temporal context established by prior frames. GAN-based models, specifically designed for video synthesis, may sample noise vectors or use a sequence of frames as input, transforming these into continuous and temporally coherent video outputs through the generator network. The determinator evaluates the temporal consistency and realism of the output, ensuring the generated video mimics the motion dynamics and object interactions present in real-world video data. Such models may also use attention mechanisms to focus on critical elements within each frame and their evolution across time, facilitating realistic scene transitions and motion patterns. The generation process may include user-defined input such as initial frames, motion descriptions, or specific video attributes, providing control over the output.

Audio generation models, including Audio Transformers or autoregressive architectures like WaveNet, generate new audio sequences by predicting audio samples based on learned dependencies in sequential sound data. For autoregressive models, the generation process involves producing each audio sample one at a time, conditioned on previously generated samples, allowing the model to build complex audio patterns such as speech, music, or ambient sounds. The model starts with an initial segment or a random seed and uses its learned parameters to predict and synthesize subsequent samples, constructing a continuous audio waveform. Audio Transformers, on the other hand, may use attention mechanisms to identify important temporal segments within the input audio and synthesize new output based on these learned patterns. The user can control the type of audio generated by providing parameters such as pitch, tempo, or initial sound clips, enabling the model to generate outputs tailored to specific use cases like speech synthesis, music composition, or environmental sound generation.

In some embodiments, generative AI models may also integrate multiple modalities, enabling cross-modal generation where output in one modality influences or conditions the generation in another. For example, a video generation model may use text descriptions as input, synthesizing video content that aligns with the specified narrative or visual scene described. Similarly, image generation models may generate visual representations based on audio inputs, such as generating animations synchronized to musical rhythms or speech patterns. These cross-modal systems typically involve conditional GANs or multi-modal transformers, where the model processes input from one domain (e.g., text or audio) and learns to generate output in another domain (e.g., video or image) by aligning the patterns and dependencies between the different modalities. These models may allow users to generate complex, multimodal content based on combinations of inputs, such as using textual prompts to control the visual and auditory elements of a video.

It will be understood that the embodiment of the generative AI subsystem 300 illustrated in FIG. 3 is exemplary and that other embodiments may vary. The generative AI subsystem 300, as well as its constituent elements, may vary, and modifications or alternative configurations may be implemented without departing from the broader scope of the invention. For instance, different machine learning algorithms, data sources, optimization techniques, or training methodologies may be employed depending on system requirements, application domain, and available computational resources. Furthermore, features and functionalities described in one embodiment may be combined with those of another embodiment as needed, and vice versa.

FIG. 4 illustrates a process flow for viability testing of applications in a distributed computing environment, in accordance with an embodiment of the invention. The method 400 may be executed by a system (e.g., system 130), which may include multiple subsystems such as generative AI subsystems, where each generative AI subsystem is associated with a corresponding application, primary generative AI subsystem, and an ML subsystem.

As shown in block 402, the process flow includes analyzing, using each generative artificial intelligence (AI) subsystem of a plurality of generative AI subsystems, functional accessibility of a corresponding application. Each generative AI subsystem may be associated with a specific application and may evaluate the usability, user interface elements, and interaction pathways within the application. The functional accessibility analysis may involve identifying the navigability of the application, examining interface components to assess their clarity and ease of use, and documenting common user actions to understand interaction patterns. In some embodiments, the generative AI subsystem may implement a usability assessment framework, such as user interaction data analysis, heuristic evaluation, natural language processing (NLP) for analyzing user feedback, simulated user interactions, automated usability testing, interface element recognition, complexity analysis, or predictive usability modeling.

For example, the generative AI subsystem may perform user interaction data analysis to track and analyze user interaction patterns, such as navigation flows, click frequencies, and error rates. This analysis may help the generative AI subsystem identify features or functions that users find unintuitive or challenging. The generative AI subsystem may also apply heuristic evaluation techniques to evaluate the application against predefined usability principles, such as consistency and error prevention. Natural language processing may be used to analyze user feedback and comments, identifying patterns in user complaints or areas where users express satisfaction. Additionally, simulated user interactions, through agent-based testing, may allow the generative AI subsystem to observe and document how a user agent interacts with the application, identifying potential usability challenges. The generative AI subsystem may also calculate automated usability metrics, such as time on task, success rate, and the number of steps required to complete common functions.

In further embodiments, interface element recognition and complexity analysis may be applied to evaluate the layout and density of interface elements, identifying high-complexity areas that may impact usability. Predictive usability modeling may also be used, where the subsystem leverages data from other applications to predict usability issues in new or updated applications by identifying patterns that previously led to usability challenges. Based on these analyses, the generative AI subsystem may detect and document workflows and dependencies within the application that impact functional accessibility, and may generate quantitative accessibility metrics that represent the application's usability, providing a foundational analysis for subsequent documentation and compatibility testing.

As shown in block 404, the process flow includes generating, using each generative artificial intelligence (AI) subsystem, a first output based on at least the analysis, wherein the first output comprises documentation for interacting with the corresponding application. This documentation may include step-by-step instructions, visual aids, or other guides tailored to improve user interaction with the application. The generative AI subsystem may produce documentation that details standard user workflows, navigational pathways, and specific instructions for performing common tasks within the application.

In further embodiments, the first output may include interactive elements, such as contextual tooltips and embedded help elements that appear within the application interface, providing users with on-demand assistance and instructions specific to each interface component. Visual aids, such as annotated screenshots, flow diagrams, or user interface mappings, may be included to support visual understanding of tasks and workflows. The documentation may adapt dynamically based on user role, experience level, or recent user interactions with the application, providing tailored guidance that aligns with the user's specific needs and interaction history.

In some embodiments, each generative AI subsystem may be configured to analyze the functional accessibility of its corresponding application in response to a change in that application. Such changes may include, but are not limited to, an update to the application's user interface components, where modifications to layout, color schemes, or interaction elements alter the user experience. Additionally, changes may involve the enhancement or addition of new features and functionalities, which may impact how users navigate or interact with the application. Modifications to application workflows or task sequences, potentially affecting user interaction pathways, may also prompt analysis by the generative AI subsystem to assess how these adjustments influence usability.

Further types of changes may include alterations in application dependencies, where the application requires communication or data exchange with additional systems or components within the distributed computing environment. Revisions to error handling mechanisms, such as updates to error messages or user feedback prompts, may also be analyzed to ensure that users receive clear, actionable guidance during potential issues. Performance parameter adjustments, such as modifications to response times or resource allocation, that affect the operational efficiency of the application may similarly trigger accessibility analysis. Security updates, including changes to user access controls, permissions, or authentication processes, may impact the application's accessibility, as may updates to accessibility features aimed at supporting assistive technologies or compliance with accessibility standards. Through analyzing these types of changes, each generative AI subsystem can update documentation and usability information, ensuring that users receive accurate and current interaction guidance reflective of the application's latest functionality and interface configuration.

As shown in block 406, the process flow includes receiving, using a primary generative AI subsystem, the first outputs from the plurality of generative AI subsystems. Each of these first outputs may contain documentation generated by the individual generative AI subsystems, providing insights into the functional accessibility, user interaction guidelines, and usability of the respective applications within the distributed computing environment. The primary generative AI subsystem may aggregate and process these first outputs to create a unified understanding of the applications' functionality and accessibility.

In further embodiments, the primary generative AI subsystem may organize and standardize the information received in the first outputs, making the data consistent for subsequent processing. For instance, each first output may be processed to align the format, terminology, and structure of the documentation, enabling the primary generative AI subsystem to perform a cohesive analysis across the applications. This standardized collection of documentation from multiple applications provides a consolidated view of each application's usability and accessibility within the larger environment, preparing the system to determine dependencies and interactions between applications.

The primary generative AI subsystem may be configured to analyze this aggregated documentation to identify similarities, differences, or overlapping functionalities across the applications, allowing the system to form a foundational dataset that may be leveraged for further analysis in dependency determination, data flow assessment, and compatibility testing.

As shown in block 408, the process flow includes determining, using the primary generative AI subsystem, dependency information among the applications based on the first outputs. This dependency information may include data flow requirements, communication protocols, task sequences, and resource-sharing mechanisms among the applications. By analyzing the documentation in the first outputs, the primary generative AI subsystem may identify both direct and indirect dependencies that affect how applications interact within the distributed computing environment.

In additional embodiments, the primary generative AI subsystem may classify dependencies among applications by type, including functional dependencies, data-sharing dependencies, access control dependencies, and processing sequence dependencies. For instance, the primary generative AI subsystem may detect dependencies where one application requires specific data inputs from another, or where task completion in one application triggers processes in another. By identifying such dependencies, the primary generative AI subsystem enables a clearer understanding of application interconnectivity, essential for optimizing system performance and compatibility.

In some cases, the primary generative AI subsystem may analyze data flow requirements and communication protocols between applications to categorize dependencies as direct data dependencies, sequential task dependencies, or conditional execution dependencies. This analysis may further reveal critical interdependencies, highlighting points within the system where failure or delay in one application could impact others. The identification and classification of these dependencies provide operational insights into application interactions, supporting the generation of comprehensive documentation for data interaction and enabling targeted compatibility testing within the distributed environment.

As shown in block 410, the process flow includes generating, using the primary generative AI subsystem, a second output based on the dependency information, wherein the second output comprises documentation for data interaction among the applications. This documentation may describe how data flows between applications, identify necessary protocols for data exchange, and provide guidelines for maintaining compatibility and synchronization across the distributed computing environment.

In further embodiments, the second output may include a visual interaction map that illustrates data flow paths, data dependencies, and interaction sequences among the applications. This map may allow users or system administrators to view and understand data relationships, providing a visual representation of inter-application connectivity that can highlight potential bottlenecks or vulnerabilities in data exchanges. The documentation may also specify data integration protocols, detailing required data formatting standards, communication methods, and security requirements for secure and consistent data interactions between applications.

In some implementations, the second output may include a structured data integration protocol that outlines compatibility requirements, data transformation procedures, and access controls necessary for effective data sharing. The documentation may further provide recommendations or best practices for optimizing data interactions to reduce latency and improve reliability across applications. By generating this second output, the primary generative AI subsystem enables a comprehensive understanding of data interactions within the environment, supporting both ongoing operations and future updates by ensuring that all applications operate cohesively within the distributed system.

As shown in block 412, the process flow includes generating, using a machine learning (ML) subsystem, one or more test scripts based on the dependency information, wherein the one or more test scripts are configured to evaluate interface viability and functional compatibility between the applications in the distributed computing environment. The ML subsystem may leverage the identified dependencies, including data flow requirements, communication protocols, and functional dependencies, to generate test scripts that specifically target points of interaction and dependency among applications.

In further embodiments, the test scripts generated by the ML subsystem may simulate user interactions, application responses, and data exchanges to assess how applications interface with one another. The test scripts may examine various compatibility aspects, such as the ability of applications to handle required data formats, synchronization of shared resources, and responsiveness to cross-application tasks. By conducting these evaluations, the ML subsystem may identify potential issues related to connectivity, resource contention, or operational delays that could arise when applications interact within the distributed environment.

In some implementations, the ML subsystem may dynamically adjust the test scripts based on observed outcomes or detected issues, improving the test coverage for complex or evolving application dependencies. Such adaptive testing approach may allow the ML subsystem to refine its assessments continuously, such that the compatibility evaluations remain relevant as applications are updated or modified. The test results generated through these scripts may provide actionable insights into necessary adjustments or optimizations, supporting robust and seamless interactions among applications within the distributed computing environment.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the methods described above may include fewer steps in some cases, while in other cases the methods may include additional steps. The steps of the methods and modifications to the steps of the methods described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for viability testing of applications in a distributed computing environment, the system comprising: a plurality of generative artificial intelligence (AI) subsystems, wherein each generative AI subsystem is associated with a corresponding application within the distributed computing environment, wherein each generative AI subsystem is configured to: analyze functional accessibility of the corresponding application, comprising: determining one or more application interaction patterns based on analyzing application navigability, application interface components, and common user actions; performing user interaction data analysis to determine one or more application functions that are associated with a user challenge, based on navigation flows, click frequencies, and error rates associated with the corresponding application; simulating user interactions associated with the corresponding application, comprising determining usage data associated with time on task, success rate, and number of steps for completion associated with the one or more application functions; and identifying one or more high complexity user interface areas associated with an application user interface of the corresponding application, based on at least a layout and a density of user interface elements of the application user interface; and generate a first output based on at least the analysis, wherein the first output comprises documentation for interacting with the corresponding application; and a primary generative AI subsystem operatively coupled to the plurality of generative AI subsystems, wherein the primary generative AI subsystem is configured to: receive the first outputs from the plurality of generative AI subsystems; determine dependency information associated with application dependencies among the plurality of applications based on the first outputs, comprising application data flow requirements, application communication protocols, application task sequences and application resource sharing mechanisms, wherein determining dependency information comprises: classifying the plurality of applications based on an application type, comprising functional dependencies, data sharing dependencies, access control dependencies, and processing sequence dependencies; and analyzing data flow requirements and communication protocols between the plurality of applications to categorize the application dependencies by data dependencies sequential task dependences, and/or conditional dependencies; and generate a second output based on at least the dependency information, wherein the second output comprises documentation for data interaction among the applications, and a machine learning (ML) subsystem, wherein the ML subsystem is configured to: generate one or more test scripts associated with testing the application dependencies among the plurality of applications, based on at least the application data flow requirements and application communication protocols, wherein the one or more test scripts are structured to simulate user interactions, application responses and data exchanges associated with the plurality of applications.

2. The system of claim 1, wherein the one or more test scripts are configured to evaluate interface viability and functional compatibility between the plurality of applications in the distributed computing environment, wherein the ML subsystem is configured to: identify, via the one or more test scripts, one or more compatibility aspects associated with the plurality of applications, comprising data formats, synchronization of shared resources, and responsiveness to cross-application tasks; and determine one or more application interaction issues comprising connectivity, resource contention, and/or operation delays.

3. The system of claim 1, wherein, in analyzing the functional accessibility, each generative AI subsystem is configured to implement a usability assessment framework on the corresponding application, wherein the usability assessment framework comprises at least one of the user interaction data analysis, heuristic evaluation, natural language processing (NLP) for user feedback, the simulated user interactions, automated usability testing, interface element recognition and complexity analysis, or predictive usability modeling.

4. The system of claim 3, wherein, in analyzing the functional accessibility, each generative AI subsystem is configured to:

assess, using the usability assessment framework, user interface elements of the corresponding application to identify navigability, usability, and interaction pathways;

evaluate performance metrics associated with user interactions based on the navigability and interaction pathways to determine operational efficiency;

analyze error handling mechanisms and user feedback prompts within the corresponding application based on the performance metrics to assess clarity and accessibility of functionality;

determine application workflows and dependencies that impact user access to specific functions based on the analysis of error handling mechanisms and the user feedback prompts; and generate accessibility metrics from the application workflows and dependencies, wherein the accessibility metrics comprise a quantitative representation of the corresponding application's functional accessibility for use.

5. The system of claim 1, wherein the first output comprises step-by-step instructions for performing common tasks within the corresponding application based on the identified navigability and interaction pathways.

6. The system of claim 1, wherein the first output further comprises visual aids, including annotated screenshots, flow diagrams, or user interface mappings, to enhance user understanding of interactions within the corresponding application.

7. The system of claim 1, wherein each generative AI subsystem is configured to analyze the functional accessibility of the corresponding application in response to a change in the corresponding application.

8. The system of claim 7, wherein the change in the corresponding application comprises at least one of an update to the corresponding application's user interface components, including modifications to layout, color scheme, or interaction elements, an enhancement or addition of new features and/or functionalities within the corresponding application, a modification to application workflows or task sequences that impacts user interaction pathways, a change in application dependencies of the corresponding application, wherein the corresponding application requires communication or data exchange with additional systems or components within the distributed computing environment, a revision of error handling mechanisms, including updates to error messages or feedback prompts presented to users, an adjustment to performance parameters, such as response times or resource allocation, that impacts the corresponding application's operational efficiency, a security update that affects user access controls, permissions, or authentication processes within the corresponding application, or an alteration to accessibility features.

9. The system of claim 1, wherein the first output comprises interactive documentation that adapts based on user role, experience level, or recent interactions within the corresponding application, providing tailored guidance for navigating and using the corresponding application.

10. The system of claim 1, wherein the documentation in the first output comprises at least contextual tooltips and embedded help elements that appear within the corresponding application's interface, providing users with on-demand assistance and instructions specific to each interface component or function.

11. The system of claim 1, wherein the documentation for data interaction among the applications comprises a visual interaction map that illustrates data flow paths, data dependencies, and interaction sequences among the applications, enabling users to understand data relationships and identify potential bottlenecks in data exchanges.

12. The system of claim 1, wherein the documentation for data interaction among the applications comprises a data integration protocol that specifies data formatting standards, communication methods, and security requirements for data exchanges between applications, providing standardized instructions for maintaining compatibility and secure data interactions.

13. The system of claim 1, wherein the ML subsystem is configured to:

implement the one or more test scripts at the plurality of applications;

generate test results based on implementation of the one or more test scripts; and in response to detecting one or more issues in the test results, dynamically adjust the one or more test scripts.

14. A method for viability testing of applications in a distributed computing environment, the method comprising: analyzing, using each generative artificial intelligence (AI) subsystem of a plurality of generative AI subsystems, functional accessibility of a corresponding application, comprising: determining one or more application interaction patterns based on analyzing application navigability, application interface components, and common user actions; performing user interaction data analysis to determine one or more application functions that are associated with a user challenge, based on navigation flows, click frequencies, and error rates associated with the corresponding application; simulating user interactions associated with the corresponding application, comprising determining usage data associated with time on task, success rate, and number of steps for completion associated with the one or more application functions; and identifying one or more high complexity user interface areas associated with an application user interface of the corresponding application, based on at least a layout and a density of user interface elements of the application user interface; generating, using each generative artificial intelligence (AI) subsystem, a first output based on at least the analysis, wherein the first output comprises documentation for interacting with the corresponding application; receiving, using a primary generative AI subsystem, the first outputs from the plurality of generative AI subsystems; determining, using the primary generative AI subsystem, dependency information associated with operational application dependencies among the plurality of applications based on the first outputs, comprising application data flow requirements, application communication protocols, application task sequences and application resource sharing mechanisms, wherein determining dependency information comprises: classifying the plurality of applications based on an application type, comprising functional dependencies, data sharing dependencies, access control dependencies, and processing sequence dependencies; and analyzing data flow requirements and communication protocols between the plurality of applications to categorize the application dependencies by data dependencies sequential task dependences, and/or conditional dependencies; generating, using the primary generative AI subsystem, a second output based on the dependency information, wherein the second output comprises documentation for data interaction among the applications; and generating, via a machine learning (ML) subsystem, one or more test scripts associated with testing the application dependencies among the plurality of applications, based on at least the application data flow requirements and application communication protocols, wherein the one or more test scripts are structured to simulate user interactions, application responses and data exchanges associated with the plurality of applications.

15. The method of claim 14, wherein the one or more test scripts are configured to evaluate interface viability and functional compatibility between the plurality of applications in the distributed computing environment, further comprising: identifying, via the one or more test scripts, one or more compatibility aspects associated with the plurality of applications, comprising data formats, synchronization of shared resources, and responsiveness to cross-application tasks; and determining one or more application interaction issues comprising connectivity, resource contention, and/or operation delays.

16. The method of claim 15, wherein the analyzing the functional accessibility further comprises implementing a usability assessment framework on the corresponding application, wherein the usability assessment framework comprises at least one of the user interaction data analysis, heuristic evaluation, natural language processing (NLP) for user feedback, the simulated user interactions, automated usability testing, interface element recognition and complexity analysis, or predictive usability modeling.

17. The method of claim 16, wherein analyzing the functional accessibility further comprises:

assessing, using the usability assessment framework, user interface elements of the corresponding application to identify navigability, usability, and interaction pathways;

evaluating performance metrics associated with user interactions based on the navigability and interaction pathways to determine operational efficiency;

analyzing error handling mechanisms and user feedback prompts within the corresponding application based on the performance metrics to assess clarity and accessibility of functionality;

determining application workflows and dependencies that impact user access to specific functions based on the analysis of error handling mechanisms and the user feedback prompts; and generating accessibility metrics from the application workflows and dependencies, wherein the accessibility metrics comprise a quantitative representation of the corresponding application's functional accessibility for use.

18. A computer program product for viability testing of applications in a distributed computing environment, the computer program product comprising a non-transitory computer-readable medium comprising code configured to cause an apparatus to: analyze, using each generative artificial intelligence (AI) subsystem of a plurality of generative AI subsystems, functional accessibility of a corresponding application, comprising: determining one or more application interaction patterns based on analyzing application navigability, application interface components, and common user actions; performing user interaction data analysis to determine one or more application functions that are associated with a user challenge, based on navigation flows, click frequencies, and error rates associated with the corresponding application; simulating user interactions associated with the corresponding application, comprising determining usage data associated with time on task, success rate, and number of steps for completion associated with the one or more application functions; and identifying one or more high complexity user interface areas associated with an application user interface of the corresponding application, based on at least a layout and a density of user interface elements of the application user interface; generate, using each generative artificial intelligence (AI) subsystem, a first output based on at least the analysis, wherein the first output comprises documentation for interacting with the corresponding application; receive, using a primary generative AI subsystem, the first outputs from the plurality of generative AI subsystems; determine, using the primary generative AI subsystem, dependency information associated with operational application dependencies among the plurality of applications based on the first outputs, comprising application data flow requirements, application communication protocols, application task sequences and application resource sharing mechanisms, wherein determining dependency information comprises: classifying the plurality of applications based on an application type, comprising functional dependencies, data sharing dependencies, access control dependencies, and processing sequence dependencies; and analyzing data flow requirements and communication protocols between the plurality of applications to categorize the application dependencies by data dependencies sequential task dependences, and/or conditional dependencies; generate, using the primary generative AI subsystem, a second output based on the dependency information, wherein the second output comprises documentation for data interaction among the applications; and generate, via a machine learning (ML) subsystem, one or more test scripts associated with testing the application dependencies among the plurality of applications, based on at least the application data flow requirements and application communication protocols, wherein the one or more test scripts are structured to simulate user interactions, application responses and data exchanges associated with the plurality of applications.

19. The computer program product of claim 18, wherein the one or more test scripts are configured to evaluate interface viability and functional compatibility between the plurality of applications in the distributed computing environment, wherein the code further causes the apparatus to: identify, via the one or more test scripts, one or more compatibility aspects associated with the plurality of applications, comprising data formats, synchronization of shared resources, and responsiveness to cross-application tasks; and determine one or more application interaction issues comprising connectivity, resource contention, and/or operation delays generate.

20. The computer program product of claim 18, wherein the analyzing the functional accessibility further comprises implementing a usability assessment framework on the corresponding application, wherein the usability assessment framework comprises at least one of the user interaction data analysis, heuristic evaluation, natural language processing (NLP) for user feedback, the simulated user interactions, automated usability testing, interface element recognition and complexity analysis, or predictive usability modeling.

* * * * *